May 30, 1933.  F. H. BATEMAN ET AL  1,912,248
POTATO PLANTER
Filed April 27, 1929    2 Sheets-Sheet 1

Inventors:-
Fred H. Bateman
Isaac Trolley
by their Attorneys
Howson & Howson

May 30, 1933.    F. H. BATEMAN ET AL    1,912,248
POTATO PLANTER
Filed April 27, 1929    2 Sheets-Sheet 2

Inventors,
Fred. H. Bateman
Isaac Trolley
by their Attorneys,
Howson & Howson

Patented May 30, 1933

1,912,248

UNITED STATES PATENT OFFICE

FRED H. BATEMAN, OF GRENLOCH, NEW JERSEY, AND ISAAC TROLLEY, OF YORK, PENNSYLVANIA, ASSIGNORS TO FRED H. BATEMAN COMPANY, OF PHILADELPHIA, PENNSYLVANIA, A CORPORATION OF NEW JERSEY

POTATO PLANTER

Application filed April 27, 1929. Serial No. 358,558.

This invention relates to a potato planter, and is more particularly concerned with a new and improved means for feeding potatoes to the elevator wheel. The invention further contemplates the prevention of crowding or arching in the reservoir or hopper, together with the povision of a new form of driving means for the reciprocating board.

An object of the invention then is to provide a new form of elevator wheel.

Another object is to provide an elevator wheel having a hump thereon.

Still another object is to provide an elevator wheel with an outwardly extending hump centrally located thereon.

Another object is to provide means for securing substantially uniform feeding of seeds to an elevator wheel of a potato planter.

Another object is to provide an adjustable apron for cooperation with the hump of an elevator wheel.

Yet another object is to provide new and improved means for actuating the reciprocating board of the hopper of a potato planter.

With these and other objects and applications in mind, my invention further consists in the details of construction and operation and arrangement hereinafter described and claimed, and illustrated in the accompanying drawings, wherein Fig. 1 is a perspective view of a potato planter according to my invention;

Fig. 3 is an inverted plan view of the planter of Fig. 1, while

Figure 2:
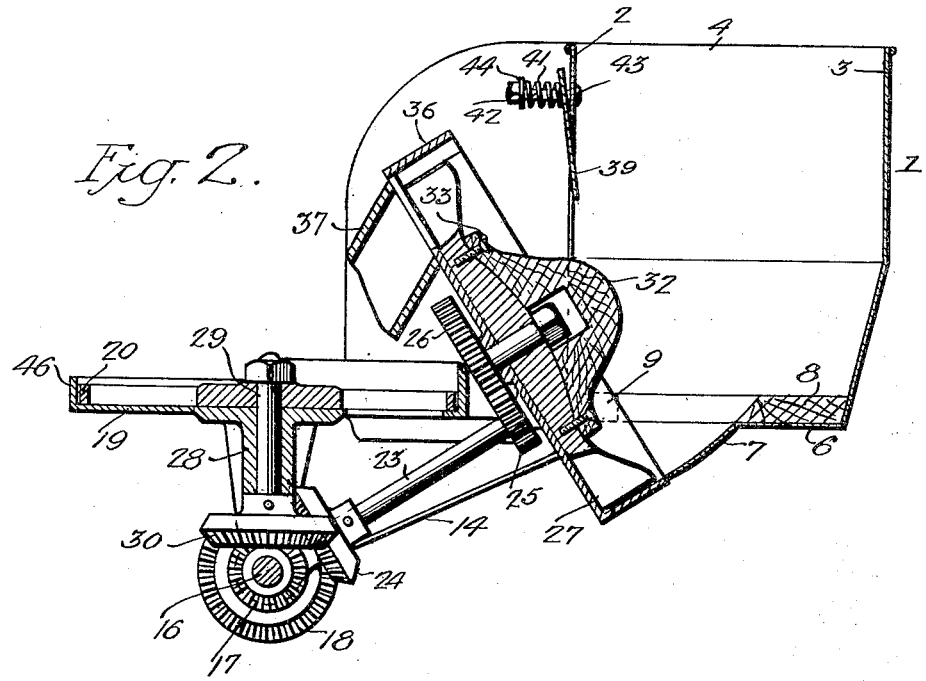
Fig. 2 is a section on the line 2—2 of Fig. 1.
Figure 3:
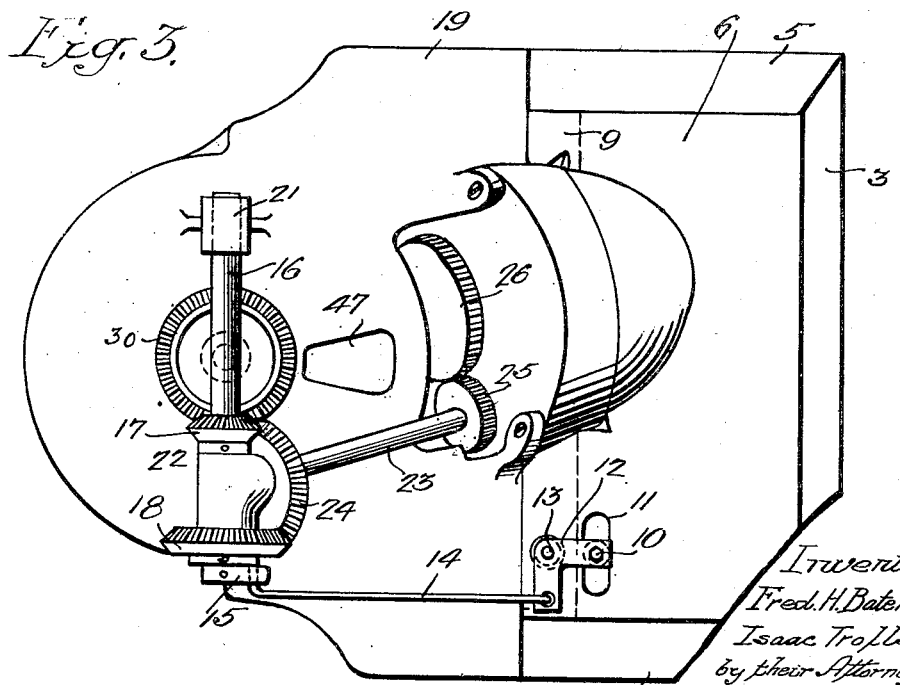

At 1 is shown a hopper comprised of front and rear side walls 2 and 3, and end walls 4 and 5. Each of the walls 3, 4, and 5 as shown, is preferably vertical along its upper surface, and slopes inwardly along its lower portion, while the wall 2 is substantially vertical throughout its extent. The hopper 1 is further provided, as shown in Fig. 2, with a bottom 6 having adjacent its front portion, a depression 7 preferably arranged as a segment of a sphere, in which the seeds in the hopper fall, prior to being fed to the elevator wheel. The depression is thus seen to be in the nature of a magazine, insuring a fairly constant supply of seed to the wheel. A reciprocating board 8 rests on the bottom 6, bearing against a longitudinally extending board 9, and is actuated, through any suitable connection 10 extending from a slot 11 in the bottom 6, by means of a bell-crank lever 12 which is rocked about a pivot point 13, mounted on the bottom 6, by means of an arm 14, which in turn is actuated by a crank 15 fixed in any suitable manner to a drive shaft 16. The drive shaft can be driven in any of a variety of manners as by a sprocket and chain (not shown), and preferably carries thereon pinions 17 and 18.

The base plate 19, forming a support for a feeder wheel 20, is preferably provided with a bearing 21 for the shaft 16 and a bearing 22 which not only acts as a bearing for the shaft 16, but further serves a similar function for the shaft 23 which carries on one end a gear 24 meshing with the pinion 18 of the shaft 16, and at its other end a pinion 25 meshing with a gear 26 secured to the elevator wheel 27. Both the feeding wheel 20 and the base plate 19 are provided with hubs, the hub of the base plate 19 having a rearwardly extending sleeve 28 through which passes a shaft 29 secured at one end to the hub of the feeder wheel 20, and carrying on its other end a gear 30 meshing with the pinion 17 on the shaft 16.

Thus it will be seen that by a single drive means, power is transmitted for the simultaneous rotation of the feeder wheel 20 and the elevator wheel 27, the reciprocating board 8 being actuated at the same time through the crank 15 and the arm 14. The crank 15 and the bell-crank lever 12 are preferably so designed that for each complete revolution of the crank 15 the bell-crank lever 12 will traverse an arc of approximately 90°, and will be returned to its original position, giving a reciprocating motion to the board 8. When the potatoes 31 are heaped into the hopper 1, they will normally have a tendency to arch in the hopper, preventing feeding to the elevator wheel 27. Occurrences of overcrowding, which likewise prevents efficient feeding, and which results in bruised seeds, will also be encountered. To avoid this action, the elevator wheel has been provided in the present instance with a hump 32 which has an outwardly extending knob portion and which is mounted in any desirable position, in the present instance centrally, on the elevator wheel, in any suitable manner, as by screws 33.

As the potatoes from the hopper 1 are fed into the openings 34 arranged around the periphery of the elevator wheel 27, they pass through the opening 35 in the wall 2, being retained in place by the elevator wheel guide rim 36, and are discharged through a spout 37 to the feeder wheel 20. The spout 37 is preferably provided with an adjustable cover 38 which serves the purpose of permitting the discharge of but a single seed at a time.

Figure 1:
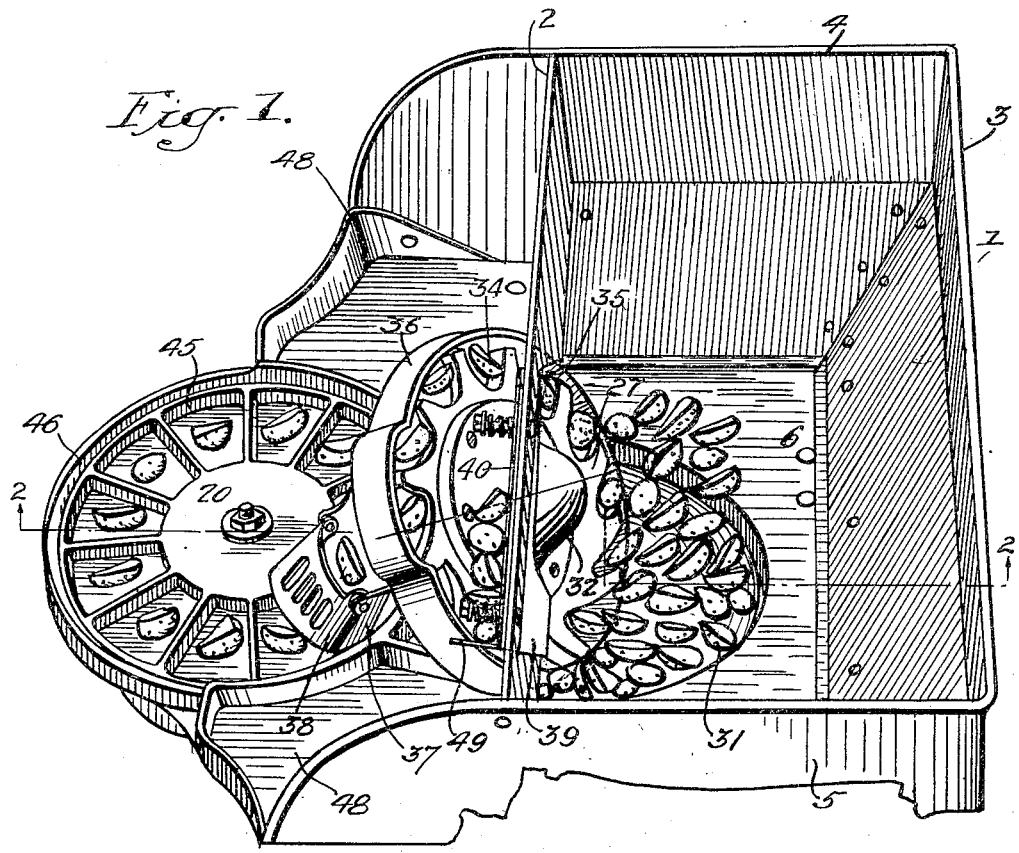
Figure 4:
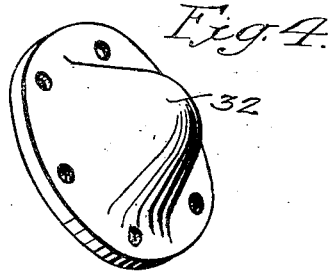
Fig. 4 is a perspective view of the hump employed in connection with the elevator wheel.

During the operation of the ordinary hopper, according to the prior art difficulty was encountered in keeping a supply of potatoes, while the elevator wheel was in operation, in the lower left hand corner of the hopper shown in Fig. 1 due to the counter-clockwise rotation of the wheel pulling all the potatoes in the direction of its travel. As a result of its action, the potatoes would not start filling the openings or pockets 34 of the elevator wheel until each of these openings had come approximately adjacent the vertical center line of the wheel. The hump 32 of my invention effectively avoids this action by causing the potato seeds to be lifted and delivered by the action of the hump into the space between the wheel 2 and the lower left hand portion of the elevator wheel, as shown in Fig. 1, at a point beyond the communication with the spout 37. The seeds so accumulated will normally be guided by means of the hump into those openings 34 of the wheel 27 which are leaving the vicinity of the spout 37, thus serving a function hitherto impossible of achievement, namely, insuring the filling of all of the openings of the elevator.

In order to care for the contingency that jamming occurs due to a surplus of potatoes collecting in the pocket formed between the elevator wheel and the exterior of the wall 2 or an unusually large seed enters the pocket, an adjustable apron 39 is provided, extending over the opening 35 around the hump 32, and has an outwardly extending continuation in the form of a tongue 40. For a portion of its extent, the apron 39 overlaps the side wall 2 and is normally urged thereagainst by suitable means such as a spring 41 mounted on a pin 42 which passes through the apron 39 and is secured against the wall 2 by means such as a head 43 and a bolt and washer 44.

It is to be understood that any desired number of such spring-pressed bolts can be employed at will without departing from the spirit of the invention. In the event of overcrowding, the apron will give, the lower edge of the apron moving inwardly, and the upper edge pivoting about the edge of the wall 2 defining the upper limits of the opening 35, and will permit the excess accumulation of potatoes or enlarged seeds to be discharged through the opening normally closed by the apron. The tension of the spring 41 can be adjusted by means of the nut 44, to adapt the apron tension for accommodating any desired size of seed. In the present instance, the apron is guided in its movement by means of a flange 49 extending at right angles to the major extent of the apron. While this is shown as a preferred form of guiding means for the apron, it is to be understood that any suitable type of guide means can be employed.

Because of the reciprocating action of the board 8, the potatoes will be reciprocated backwardly and forwardly with respect to the hump 32 at least once with each revolution of the drive shaft 16. Accordingly, any tendency of the potatoes to arch or overcrowd in the hopper will be avoided because of the vibratory motion imparted thereto through the reciprocating board.

As will be clearly noted from the foregoing description, an efficient and continuous feeding of seeds to the elevator wheel 27 is provided by my invention. The seeds passing through the spout 37 will fall one by one into the openings 45 of the feeder wheel 20 about which is mounted an annular gear rim 46, in the nature of a flange secured to the base plate 19. The seeds will be discharged from the openings 45, and thence through an opening 47 provided in the base plate 19, from which it falls into the furrow. In the event that through any unforeseen contingency the openings 45 are not provided with seeds, a plurality of seeds are carried in the auxiliary reservoirs 48 provided one on each side of the feeder wheel 20, and are fed by hand when the operator observes that one of the openings 45 is not "loaded."

It will thus be seen that by my invention, each opening of the elevator wheel is supplied with a seed, and arching and overcrowding of the potatoes in the hopper is avoided despite the fact that the customary guide rail is dispensed with. It will further be seen that the reciprocating board is actuated by a new form of drive means and cooperates with the hump of the elevator wheel to prevent the aforementioned arching and overcrowding.

It has also been pointed out that an adjustable apron is employed to prevent crushing and overcrowding of the seeds and that means have been provided for storing an auxiliary supply of seed for manual feeding of any vacant openings in the feeder wheel which might occur.

It is of course understood that the invention is susceptible to numerous modifications and adaptations, and it is intended that it be limited only by the scope of the appended claims.

We claim:

1. In a potato planter, a hopper, an elevator wheel for feeding potato seeds from said hopper, and having a portion of its extent arranged interiorly of said hopper, a hump mounted centrally thereof with its apex pointing in the direction of said hopper and extending partly therein, and an apron mounted on the wall in such a manner that it will yield before jamming will occur of the potato seeds between the elevator wheel and the exterior of the hopper wall.

2. In a potato planter, means partly extending into the interior of said hopper for feeding the potato seeds therefrom, a hump mounted on said means for facilitating the feeding action, and means for preventing jamming between said first mentioned means and the exterior wall of said hopper.

3. In a front wall of the hopper of a potato planter machine, said front wall having an opening therein for the reception of a portion of an elevator wheel on which a hump is mounted, a resilient closure for said opening comprising an apron adapted to pivot inwardly of said hopper to permit the passage of potato seeds, when the seeds tend to jam between the elevator wheel and the exterior of said front wall.

4. In the front wall of the hopper of a potato planter, said front wall having an opening therein for the reception of a portion of an elevator wheel on which a hump is mounted, an adjustable apron having a main portion, a guide portion extending at an angle thereto, a tongue extending outwardly from said main portion, said apron partly overlapping said front wall, and means for adjustably attaching said apron to said front wall.

5. In a potato planter, a hopper having a front wall in which there is an opening, an apron partly closing said opening and partly overlapping said wall, bolts mounted on said wall, and extending through said apron, yieldable means arranged around said bolts and abutting thereagainst at one end, and yieldingly pressing the apron against said front wall, and lock nuts and said bolts whereby the tension of the springs can be adjusted.

6. In a potato planter, a hopper, an elevator wheel arranged at an angle to said hopper and partly extending therein, for feeding potato seeds from said hopper, said wheel comprising a fixed bottom member having an opening therein, and a rotatable member having a plurality of peripheral openings to receive potato seeds, said first mentioned opening being arranged adjacent the point where the wheel first enters the hopper, and means for feeding seeds to those peripheral openings which are between said first mentioned opening and the exterior wall of said hopper at the point where the rotatable member enters the hopper prior to reentry of said openings to the hopper.

7. In a potato planter, a hopper for storing potato seeds, an elevator wheel arranged at an angle to the horizontal and extending partly into said hopper, a hump arranged on said wheel and arranged with its apex extending inwardly in the direction of said hopper and also extending partly therein, a feeder wheel, a reciprocating board in said hopper, a single drive means for simultaneously actuating the movable elements of the latter, the potato seeds being fed from said hopper by said elevator wheel to said feeder wheel and thence into the furrow, the hump preventing arching and overcrowding in the hopper, and a resiliently mounted apron on the front wall of said hopper for preventing jamming of the potato seeds between the said elevator wheel and the exterior wall of said hopper.

8. In a potato planter, a hopper, a rotatable elevator wheel partially within and partially without the hopper and having potato seed-receiving pockets, means permitting escape of seeds from the pocket during the period when the pocket is disposed exteriorly of the hopper and means on the elevator wheel and rotating therewith for feeding potato seeds through the hopper wall to the exterior of the hopper and to pockets of that portion of the elevator wheel lying between the point of discharge of the potato seeds from the pockets and the point where the elevator wheel enters the hopper through the hopper wall.

9. In a potato planter, a hopper, an elevator wheel partly extending into the hopper for feeding potato seeds from said hopper, said wheel including rotating seed-receiving pockets, discharge means for said pockets disposed exteriorly of the hopper and means for automatically feeding potato seeds to those pockets which are exterior to the hopper and between the discharge means and the exterior wall of the hopper at the point where the elevator wheel enters the hopper.

10. In a potato planter, a hopper, an elevator wheel partly extending into the hopper for feeding potato seeds from said hopper, said wheel including rotating seed-receiving pockets, discharge means for said pockets disposed exteriorly of the hopper and means for automatically feeding potato seeds to those pockets which are exterior to the hopper and between the discharge means and the exterior wall of the hopper at the point where the elevator wheel enters the hopper comprising a friction member carried by and rotating with the elevator wheel.

FRED H. BATEMAN.
ISAAC TROLLEY.